US012711063B2

(12) United States Patent
Yang et al.

(10) Patent No.: US 12,711,063 B2
(45) Date of Patent: Aug. 18, 2026

(54) MEMORY DEVICE OPTIMIZATION FOR PARALLEL DATA REQUESTS

(71) Applicant: Microchip Technology Incorporated, Chandler, AZ (US)

(72) Inventors: Nian Niles Yang, Mountain View, CA (US); Pitamber Shukla, San Jose, CA (US); Achyut Chandulal Gedia, Los Gatos, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/941,785

(22) Filed: Nov. 8, 2024

(65) Prior Publication Data

US 2026/0064592 A1 Mar. 5, 2026

Related U.S. Application Data

(60) Provisional application No. 63/687,603, filed on Aug. 27, 2024.

(51) Int. Cl.
*G06F 12/00* (2006.01)
*G06F 9/54* (2006.01)
*G06F 12/06* (2006.01)

(52) U.S. Cl.
CPC .......... *G06F 12/0646* (2013.01); *G06F 9/546* (2013.01); *G06F 2209/548* (2013.01)

(58) Field of Classification Search
CPC . G06F 12/0646; G06F 9/546; G06F 2209/548
USPC .............................................................. 711/1
See application file for complete search history.

(56) References Cited

U.S. PATENT DOCUMENTS

| | | | | |
|---|---|---|---|---|
| 11,340,794 | B2 | 5/2022 | Himelstein et al. | |
| 11,714,763 | B2 | 8/2023 | Li et al. | |
| 2014/0019969 | A1 | 1/2014 | Goggin et al. | |
| 2018/0203642 | A1* | 7/2018 | Sharma | G11C 11/5628 |
| 2019/0087349 | A1* | 3/2019 | Chung | G06F 12/0246 |
| 2021/0014133 | A1* | 1/2021 | Maciocco | H04L 41/5009 |
| 2023/0195365 | A1* | 6/2023 | Srinivasan | G06F 3/0604 711/154 |
| 2025/0342513 | A1* | 11/2025 | Chong | G06Q 30/0613 |

OTHER PUBLICATIONS

International Search Report and Written Opinion for PCT Application No. PCT/US2024/055157 (Dated May 26, 2025).

* cited by examiner

*Primary Examiner* — Mardochee Chery
(74) *Attorney, Agent, or Firm* — Hovey Williams LLP

(57) ABSTRACT

A data storage system may include a memory device and a controller. The controller may include at least one processor and a memory. The memory may include instructions stored thereon, that when executed by at least one processor, cause the at least one processor to: assign memory spaces of the memory device respectively to corresponding ones of a plurality of data requestors, said memory spaces having corresponding physical addresses; receive data access requests from the plurality of data requestors; generate a queue of the data access requests for accessing the memory device; and responsive to the data access requests, enable the plurality of data requestors to directly access corresponding ones of the respective memory spaces.

20 Claims, 7 Drawing Sheets

FIG. 1

MEMORY DEVICE OPTIMIZATION FOR PARALLEL DATA REQUESTS

CROSS-REFERENCE TO RELATED APPLICATIONS

The current patent application claims the benefit under 35 U.S.C. § 119 (e) of the priority date of U.S. Provisional Application Ser. No. 63/687,603; titled "SSD OPTIMIZATION FOR PARALLELED DATA REQUESTS"; and filed Aug. 27, 2024. The Provisional Application is hereby incorporated by reference, in its entirety, into the current patent application.

TECHNICAL FIELD

Various examples of the present disclosure relate to memory device optimization for parallel data requests.

BACKGROUND

Solid state drives (SSDs) used in large scale applications, such as in data centers, may store data for a plurality of data requestors. When multiple data requestors attempt to access the data in parallel, the SSD may experience increased latency and reduced quality of service (QOS) due to receiving multiple data requests.

This background discussion is intended to provide information related to the present invention which is not necessarily prior art.

SUMMARY OF THE INVENTION

According to various examples of the present disclosure, a system may include a memory device and a controller. The controller may include at least one processor and a memory. The memory may include instructions stored thereon, that when executed by at least one processor, cause the at least one processor to: assign memory spaces of the memory device respectively to corresponding ones of a plurality of data requestors, said memory spaces having corresponding physical addresses; receive data access requests from the plurality of data requestors; generate a queue of the data access requests for accessing the memory device; and, responsive to the data access requests, enable the plurality of data requestors to directly access corresponding ones of the respective memory spaces.

According to various examples of the present disclosure, a computer-implemented method may include: assigning memory spaces of a memory device respectively to corresponding ones of a plurality of data requestors, said respective memory spaces having corresponding physical addresses; receiving data access requests from a subset of the plurality of data requestors, said data access requests including respective physical addresses of the corresponding physical addresses; generating a queue of the data access requests for accessing the memory device; and, responsive to the data access requests, enabling the subset of the plurality of data requestors to directly access the memory device.

According to various examples of the present disclosure, non-transitory computer readable media may include instructions stored thereon, that when executed by at least one processor, cause the at least one processor to: assign memory spaces of the memory device respectively to corresponding ones of a plurality of data requestors, said memory spaces having corresponding physical addresses; receive data access requests from the plurality of data requestors; generate a queue of the data access requests for accessing the memory device; and, responsive to the data access requests, enable the plurality of data requestors to directly access corresponding ones of the respective memory spaces.

This summary is not intended to identify essential features of the examples, and is not intended to be used to limit the scope of the claims. These and other aspects of the present examples are described below in greater detail.

BRIEF DESCRIPTION OF THE DRAWINGS

FIG. 1 illustrates an example system for memory device optimization for parallel data requests;

Figure 2:
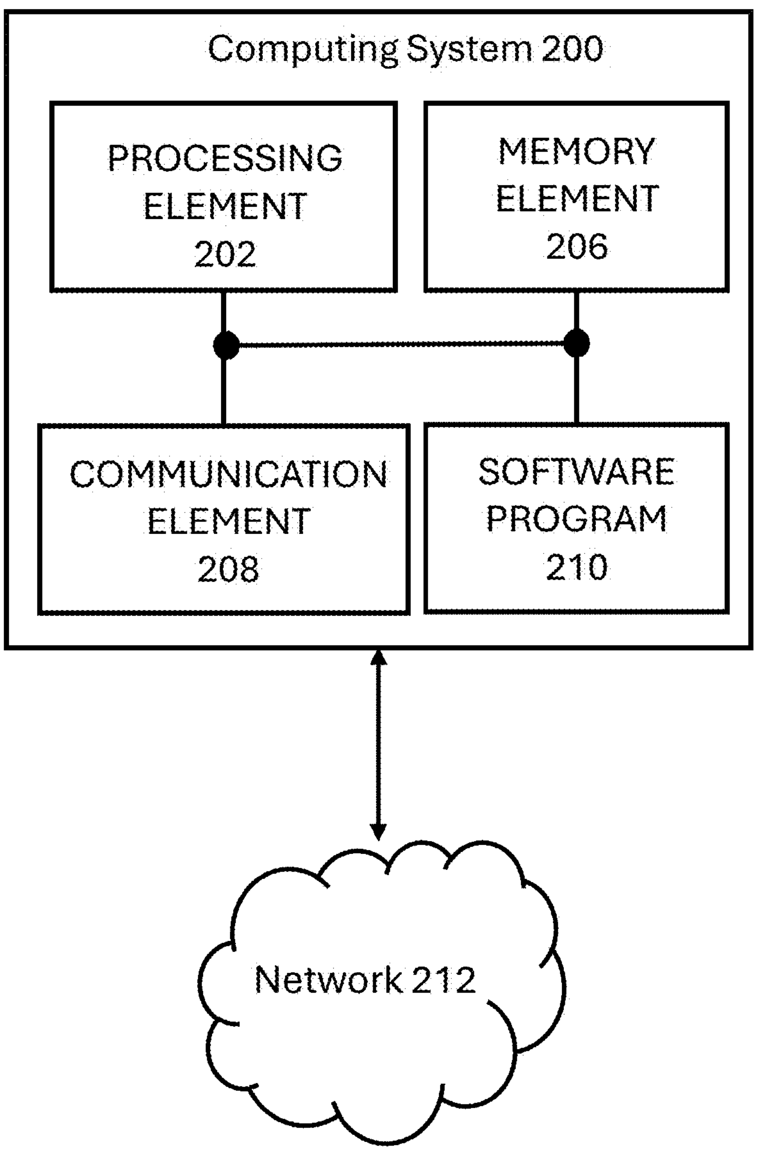
FIG. 2 illustrates an example computing system of the system of FIG. 1 connected to a communication network.

Unless otherwise indicated, the figures provided herein are meant to illustrate features of examples of this disclosure. These features are believed to be applicable in a wide variety of systems comprising one or more examples of this disclosure. As such, the figures are not meant to include all conventional features known by those of ordinary skill in the art to be required for the practice of the examples disclosed herein.

DETAILED DESCRIPTION

In the following detailed description, reference is made to the accompanying drawings, which form a part hereof and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure. Unless clearly understood or expressly identified otherwise, structures, materials, procedures, operations, and other aspects described in the context of one example may be incorporated into other examples.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

Terms of relative location and direction (e.g., above, below, left, right, upper, lower) may be used to facilitate the present descriptions of examples with reference to the figures, but unless clearly understood or expressly identified otherwise, these terms are not meant to be limiting with regard to location, direction, or overall orientation, and may, for example, change as a result of a change in overall orientation.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, operations, features, functions, or the like.

It will be readily understood that the components of the examples as generally described herein and illustrated in the drawings could be arranged and designed in a wide variety of different configurations. Thus, the following description of various examples is not intended to limit the scope of the present disclosure but is merely representative of various examples.

In various examples of the present disclosure, a data storage system may include a memory device. The memory device may store data. The data may include data of a plurality of data streams. The data storage system may be connected to a host system. In various examples, the data storage system may be connected to the host system by wired or wireless means. In various examples, the data storage system may be connected to more than one host system, such as in a multi-tenant environment, without limitation.

The data storage system may include a controller and the memory device. The controller may be operable to manage storage and retrieval of data to and from the memory device. The host system may send data to the data storage system for storage in the memory device. The host system may send a read request to the data storage system. The read request may indicate data to be retrieved from the memory device and sent back to the host system. The controller may process the read request and retrieve the data from the memory device.

In various examples, the memory device may be a solid state drive (SSD) including a plurality of non-volatile memory (NVM) media (e.g., NAND-based memory media) for data storage. In various examples, the NVM media may include chip enable (CE) ports which may also be referred to as targets. Examples may be used in single-level cell (SLC) systems, multiple-level cell (MLC) systems, triple-level cell (TLC) systems, and quadruple-level cell (QLC) systems. Applications include high performance computing (HPC), data transfer for artificial intelligence (AI), and data center solutions (DCS).

The NVM media may respectively include a local controller and a plurality of die. In various examples, the NVM media may respectively include two (2), four (4), eight (8), sixteen (16), twenty four (24), thirty two (32), or more die, without limitation. In various examples, each die may be referred to as a logical unit (LUN). Each LUN may include a plurality of planes. Each LUN may include, for example, four (4), six (6), eight (8), or more planes, without limitation. Each plane may include a cache register, a page register, and a plurality of physical memory blocks. When data is written to or retrieved from the NVM media, the data may be temporarily stored in one of the cache register and the page register. Each physical memory block may include a plurality of pages. The cache register and the page register may respectively have an equivalent data capacity of one page. Accordingly, data to be written to one page may be temporarily stored in the cache register while data to be written to another page may be temporarily stored in the page register. Data to be read may be retrieved and temporarily stored in one of the cache register and the page register while data to be written to a particular page may be stored in the other of the cache register and the page register. Accordingly, the cache register and page register enable double buffering of data to reduce data programming and read times. Each page may include a plurality of cells. Data bits may be written to the plurality of cells on a page-by-page basis. Data may be erased from the plurality of cells on a physical memory block basis.

In various examples, the host system may include or be communicatively coupled to a plurality of data requestors. The data requestors may include one or more graphics processing units (GPUs), sensor arrays, gaming systems, AI, machine learning (ML) systems, or other systems requiring data intensive operations, without limitation. The data requestors may send data requests to the host for retrieving data from the memory device. In various examples, the data requestors may retrieve data from the memory device, perform computations on the retrieved data, and store resulting data in the memory device.

In various examples, the host system may manage data requests from the data requestors in parallel. The host system may respectively assign memory spaces to each of the data requestors. The memory spaces may include virtual wordlines (VWLs) and/or virtual blocks (VBs). The host system may send a request to the data storage system to provision a dedicated memory space for a data requestor. The data storage system may provide the host system with a physical address of the dedicated memory space. The host system may provide the requestor with the physical address of the dedicated memory space. The requestor may send a data request to the host system. The data request may include the physical address of the dedicated memory space. The host system may manage a queue of data requestors for accessing the data storage system. The queue may define time slices for enabling the data requestors to access the data storage system. The host system may add the data requestor to the queue of data requestors. After adding the data requestor to the queue, the host system may send a notification to the data requestor indicating a particular time for accessing the data storage system according to the queue. The data requestor may access the data storage system during the particular time. Accordingly, the host system may manage access to the data storage system by enabling one (1) data requestor to access the data storage system at a time according to the queue.

The host system may maintain a list including the physical address(es) of the memory space(s) assigned to each data requestor. The data storage system may perform internal data management procedures, such as garbage collection (GC) and wear leveling, that may impact assigned memory spaces. For example, a particular VB assigned to a given data requestor may be retired, and the data from the particular VB may be moved to a second VB. The data storage system may notify the host system of the physical address(es) of the second VB. The host system may notify the given data requestor that the physical address(es) of its assigned memory space(s) has been changed to the physical address(es) of the second VB. The host system may notify the given data requestor of the changed memory space assignment, for example when the assignment is changed or when a new data request is received by the host system from the given data requestor.

The host system may enable the data requestors to directly access the corresponding memory spaces of the data storage system. As used herein, enabling direct access in various examples includes providing information to the requester sufficient to access the corresponding memory space without logical to physical address translation by the controller of the data storage system. For example, the corresponding assigned physical address(es) itself/themselves may be provided to the requester to enable the direct access. Accordingly, the host system may manage parallel data access to the data storage system by the data requestors with reduced computational overhead and complexity, reduced power consumption, and improved quality of service (QoS) compared to systems using traditional logical to physical address translation (and physical to logical address translation) by enabling direct access by the data requestors to the data storage system without the need for conventional address translation.

Figure 1:
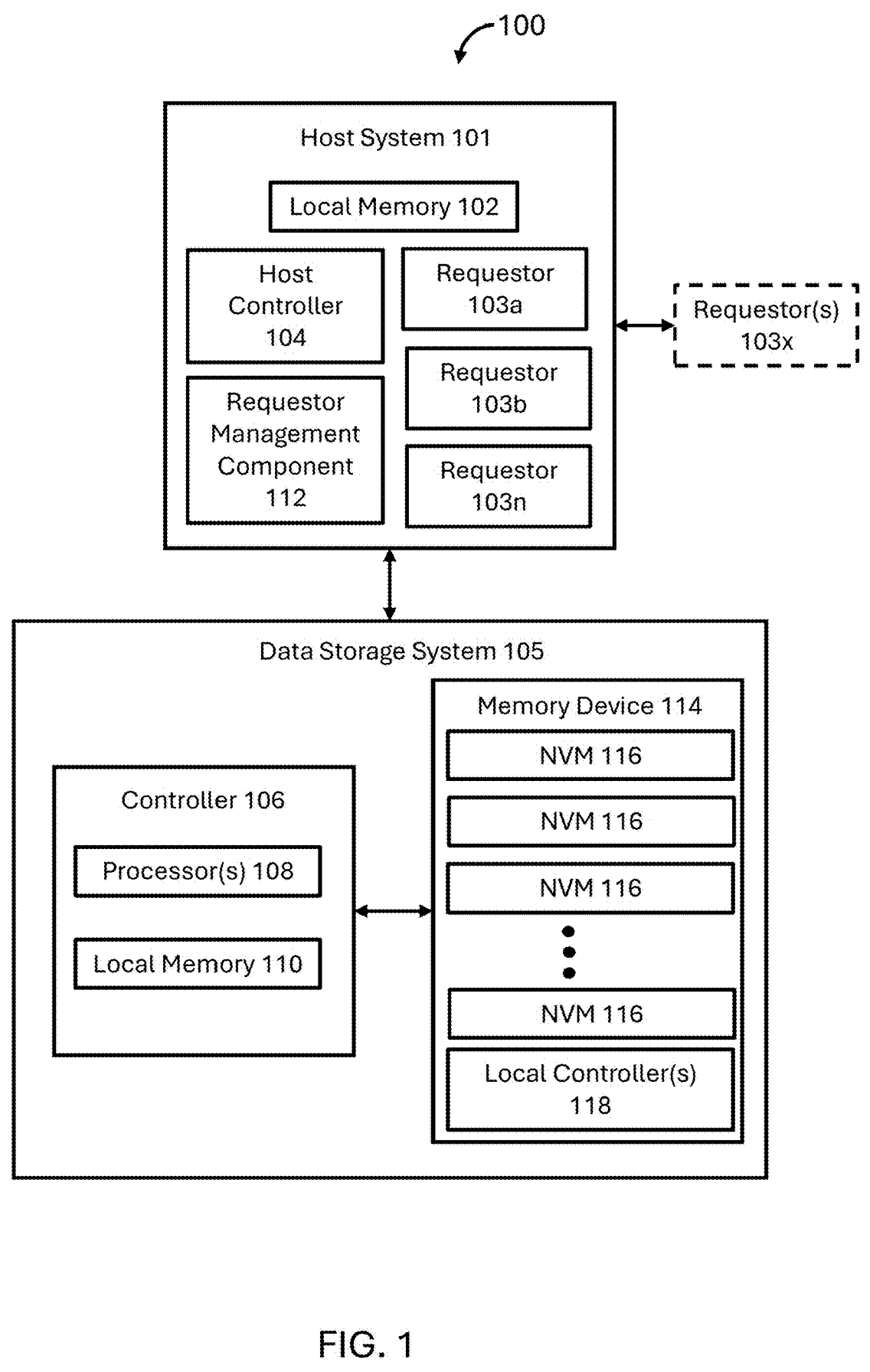

FIG. 1 illustrates an example system 100 including a host system 101 and a data storage system 105. The host system 101 may include a local memory 102, a host controller 104, data requestors 103*a*, 103*b*, . . . , 103*n*, and a requestor management component 112. Additionally, the host system 101 may be communicatively coupled to one or more data requestors 103*x* via a communication network. The communication network may be a wired or wireless network and is described in detail with reference to network 212 of FIG. 2. The requestor management component 112 may manage access to the data storage system 105 by the data requestors 103*a*, 103*b*, . . . , 103*n*, and 103*x*. In various examples, the host system 101 may be one or more server(s) operable to connect a plurality of data requestors to the data storage system 105.

The data storage system 105 may include a controller 106. The controller 106 may include a processor 108, a local memory 110, and a requestor management component 112. The data storage system 105 may also include a memory device 114. The memory device 114 may include a plurality of non-volatile memory (NVM) media 116 and one or more local controller(s) 118. The data storage system 105 may be connected to the host system 101 by a peripheral component interconnect express (PCIe) interface that connects the data storage system 105 to servers or CPUs. PCIe is a standardized interface for motherboard components.

In various examples, a read or write request may be received by the host system 101 from a requestor of the data requestors 103*a*, 103*b*, . . . , 103*n*, and 103*x*. In various examples, the read or write request may include a physical address of a data space assigned to the one of the data requestors 103*a*, 103*b*, . . . , 103*n*, and 103*x*. Also or alternatively, the request may include an identifier (ID) of the requestor. The host system 101 may identify the physical address of the data space based on the ID. In various examples, the host system 101 may retrieve the physical address (if necessary) and send the physical address to the requestor along with a time allocation for accessing the memory space by the requestor. The host system 101 may manage a queue of the data requestors 103*a*, 103*b*, . . . , 103*n*, and 103*x* for accessing respective assigned memory spaces of the data storage system 105. The queue may be managed in a time sliced manner, such that only one of the data requestors 103*a*, 103*b*, . . . , 103*n*, and 103*x* may access the data storage system 105 at any given time.

When a data request is received from the host system 101, the controller 106 uses the received physical address to identify the memory space within the NVM media 116 assigned to the corresponding one of the data requestors 103*a*, 103*b*, . . . , 103*n*, and 103*x*. The controller 106 may access the appropriate NVM media 116 to write or read the data. Access to the NVM media 116 may be via a flash physical (PHY) interface. The controller 106 may employ an error correction code (ECC) operation during encoding and decoding data to detect and correct errors and enhance data integrity. Additionally, the memory device 114 may support a direct memory access (DMA) operation enabling data to be written from the host system 101 directly to the NVM media 116 and read from the NVM media 116 directly to the host system 101. Certain commands may be issued to the controller 106 or the local controller(s) 118 using the host command layer, or non-volatile memory express management interface (NVMe-MI).

The requestor management component 112 may be operable to manage memory space assignments and access to the data storage system 105. The requestor management component 112 may assign memory spaces of the memory device 114 respectively to the data requestors 103*a*, 103*b*, . . . , 103*n*, and 103*x*. The memory space assignment may be performed by the requestor management component 112 during an initialization procedure of the system 100. Additionally, the requestor management component 112 may perform memory space assignments when new data requestors are added to the system 100. The memory spaces may include VBs and VWLs. The requestor management component 112 may identify physical addresses corresponding to the assigned memory spaces. The requestor management component 112 may maintain a list of the physical addresses of the assigned memory spaces and the corresponding data requestors 103*a*, 103*b*, . . . , 103*n*, and 103*x*. In various examples, the requestor management component 112 may respectively send the physical addresses of the assigned memory spaces to the corresponding data requestors 103*a*, 103*b*, . . . , 103*n*, and 103*x* either when the assignment is made or when a corresponding data request is received from one of the data requestors 103*a*, 103*b*, . . . , 103*n*, and 103*x*.

In various examples, the controller 106 or the local controller(s) 118 of the memory device 114 may modify memory space assignments when performing internal memory management operations. Internal memory management operations may include GC operations and wear leveling operations, without limitation. In various examples, the memory device 114 may report telemetry data to the requestor management component 112. The requestor management component 112 may modify the memory assignments based on the telemetry data. The telemetry data may include a status and usage data for memory spaces. The status may indicate whether a given memory space is healthy or unhealthy, in addition to lifetime statistics (i.e. whether the memory space is close to retirement), without limitation. The usage data may include a volume of data and a frequency of access by each data requestor 103*a*, 103*b*, . . . , 103*n*, and 103*x* for the respective memory spaces, without limitation. For example, frequently accessed data may be moved around as part of a wear leveling operation.

The wear leveling operations may include monitoring program/erase (P/E) cycles and/or error data of the memory spaces to ensure the memory spaces wear evenly over time. The monitored P/E cycles and error data may be utilized to select memory spaces for data storage. For example, a memory space having a lowest number of P/E cycles and/or a lowest number of errors may be selected to store new data from a particular data requestor of the data requestors 103*a*, 103*b*, . . . , 103*n*, and 103*x*. Accordingly, the requestor management component 112 can ensure that the memory spaces wear in an even manner to improve a lifetime of the memory device. The GC operations may include identifying valid data and invalid data for a particular memory space. The invalid data may be data that was erased. The GC operations may include moving valid data from the particular memory space to a different memory space and erasing the invalid data.

The requestor management component 112 may modify memory space assignments for a subset of the memory spaces based on the telemetry data and the wear leveling and GC operations. For example, a first memory space may be more frequently utilized than a second memory space. A data requestor of the data requestors 103*a*, 103*b*, . . . , 103*n*, and 103*x* assigned to the first memory space may be reassigned to the second memory space in order to maintain the health of the memory device. In another example, a third memory space may be retired as part of the wear leveling and GC operations. Data stored in the third memory space may be moved to another memory space during the GC operations. A data requestor of the data requestors 103*a*, 103*b*, . . . , 103*n*, and 103*x* assigned to the third memory space may be reassigned to the fourth memory space in order to maintain the health of the memory device.

When a memory space assignment changes due or according to the internal memory management or the telemetry data, the requestor management component 112 may update the list of memory assignments to reflect the assignment change.

For example, a particular memory space assigned to a given data requestor of the data requestors 103*a*, 103*b*, . . . , 103*n*, and 103*x* may be retired, and the data from the particular data space may be moved to a second data space. The data storage system 105 may notify the host system 101 of the physical address of the second data space. The requestor management component 112 may notify the given data requestor of the data requestors 103*a*, 103*b*, . . . , 103*n*, and 103*x* that the physical address of its assigned memory space has been changed to the physical address of the second memory space. In various examples, the requestor management component 112 may notify the given data requestor of the changed memory space assignment either when the assignment is changed or when a new data request is received by the host system from the given data requestor.

In various examples, the requestor management component 112 may manage a queue of the data requestors 103*a*, 103*b*, . . . , 103*n*, and 103*x*. In various examples, the queue may be generated in a first in first out (FIFO) manner, where a data requestor of a most recent request is sent to the end of the queue. Alternatively or additionally, the queue may be a weighted queue that enables certain data requests to have priority over other data requestors based on certain weighted parameters, such as frequency of access, volume of data, and/or priority data, etc. In other examples, the queue may be dynamically generated according to certain variables, such as an amount of requested data, to ensure each of the data requestors 103*a*, 103*b*, . . . , 103*n*, and 103*x* may access the corresponding memory spaces in a timely and efficient manner.

The queue may define respective time slices for enabling the data requestors 103*a*, 103*b*, . . . , 103*n*, and 103*x* to directly access the corresponding memory spaces. The data requestors 103*a*, 103*b*, . . . , 103*n*, and 103*x* may directly access the corresponding memory spaces during specified times according to the queue. The data requestors 103*a*, 103*b*, . . . , 103*n*, and 103*x* may directly access the corresponding memory spaces using the physical addresses of the memory spaces. Traditional address conversion is not required for the data requestors data requestors 103*a*, 103*b*, . . . , 103*n*, and 103*x* to access the corresponding memory spaces, for example because the physical addresses are already provided. Accordingly, the requestor management component 112 may manage parallel data access to the memory spaces of the memory device 114 by the data requestors 103*a*, 103*b*, . . . , 103*n*, and 103*x* with reduced computational overhead and complexity, reduced power consumption, and improved QoS compared to systems using traditional logical to physical address translation (and physical to logical address translation).

In various examples, instructions for executing the requestor management component 112 may be stored in the local memory 102 and/or the local memory 110. Some or all functions of the requestor management component 112 may be executed by the host controller 104, the processor(s) 108, the local controller(s) 118, other circuitry of the controller 106 and/or memory device 114, or a combination thereof.

FIG. 2 illustrates a computing system 200 connected to a communication network 212. The computing system 200 may include at least one processing element 202, at least one memory element 206, a communication element 208, and a software program 210. In various examples, the computing system 200 may be a host system (e.g. the host system 101 of FIG. 1), a server, a data requestor, and/or a data storage system (e.g. the data storage system 105 of FIG. 1), without limitation.

The software program 210 may be configured with instructions for performing and/or enabling performance of at least some of the steps set forth herein. In an embodiment, the software program 210 comprises instructions stored on computer-readable media of memory element 206. In various examples, the software program 210 may include instructions for performing operations of the requestor management component 112 discussed with reference to FIG. 1.

The communication network 212 generally allows communication between the computing system 200 and another computing device, such as between a remote host system (e.g. the host system 101 of FIG. 1), a data requestor (e.g. the data requestor(s) 103*x* of FIG. 1), a local host system, and/or a data storage system (e.g. the data storage system 105 of FIG. 1), without limitation.

The communication network 212 may include the Internet, cellular communication networks, local area networks, metro area networks, wide area networks, cloud networks, plain old telephone service (POTS) networks, and the like, or combinations thereof. The communication network 212 may be wired, wireless, or combinations thereof and may include components such as modems, gateways, switches, routers, hubs, access points, repeaters, towers, and the like. The computing system 200 may, for example, connect to the communication network 212 either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof.

The communication element 208 generally allow communication between the computing system 200 and the communication network 212. The communication element 208 may include signal or data transmitting and receiving circuits, such as antennas, amplifiers, filters, mixers, oscillators, digital signal processors (DSPs), and the like. The communication element 208 may establish communication wirelessly by utilizing radio frequency (RF) signals and/or data that comply with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof. In addition, the communication element 208 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 208 may establish communication through connectors or couplers that receive metal conductor wires or cables, like Cat 6 or coax cable, which are compatible with networking technologies such as ethernet. In certain embodiments, the communication element 208 may also couple with optical fiber cables. The communication element 208 may respectively be in communication with the processing element 202 and/or the memory element 206.

The memory element 206 may include electronic hardware data storage components such as read-only memory (ROM), programmable ROM, erasable programmable ROM, random-access memory (RAM) such as static RAM (SRAM) or dynamic RAM (DRAM), solid state drives (SSDs), cache memory, hard disks, floppy disks, optical disks, flash memory, thumb drives, universal serial bus (USB) drives, or the like, or combinations thereof. In some embodiments, the memory element 206 may be embedded in, or packaged in the same package as, the processing element 202. The memory element 206 may include, or may constitute, a "computer-readable medium." The memory element 206 may store the instructions, code, code segments, software, firmware, programs, applications, apps, services, daemons, or the like that are executed by the processing element 202. In an embodiment, the memory element 206 respectively store the software applications/program 210. The memory element 206 may also store settings, data, documents, sound files, photographs, movies, images, databases, and the like. In various examples, the memory element 206 may include a first memory component (e.g. the local memory 110 of FIG. 1) and one or more SSDs (e.g. the memory device 114 of FIG. 1).

The processing element 202 may include electronic hardware components such as processors. The processing element 202 may include digital processing unit(s). The processing element 202 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 202 may generally execute, process, or run instructions, code, code segments, software, firmware, programs, applications, apps, processes, services, daemons, or the like. For instance, the processing element 202 may respectively execute the software applications/program 210. The processing element 202 may also include hardware components such as finite-state machines, sequential and combinational logic, and other electronic circuits that can perform the functions necessary for the operation of the current disclosure. The processing element 202 may be in communication with the other electronic components through serial or parallel links that include universal busses, address busses, data busses, control lines, and the like.

Through hardware, software, firmware, or various combinations thereof, the processing element 202 may—alone or in combination with other processing elements—be configured to perform the operations of embodiments of the present disclosure. The embodiments described herein in connection with the attached drawing figures are intended to describe aspects of the disclosure in sufficient detail to enable those skilled in the art to practice the disclosure. Other embodiments can be utilized and changes can be made without departing from the scope of the present disclosure. The system may include additional, less, or alternate functionality and/or device(s), including those discussed elsewhere herein. The above detailed description is, therefore, not to be taken in a limiting sense. The scope of the present disclosure is defined only by the appended claims, along with the full scope of equivalents to which such claims are entitled, unless otherwise expressly stated and/or readily apparent to those skilled in the art from the description.

Figure 3:
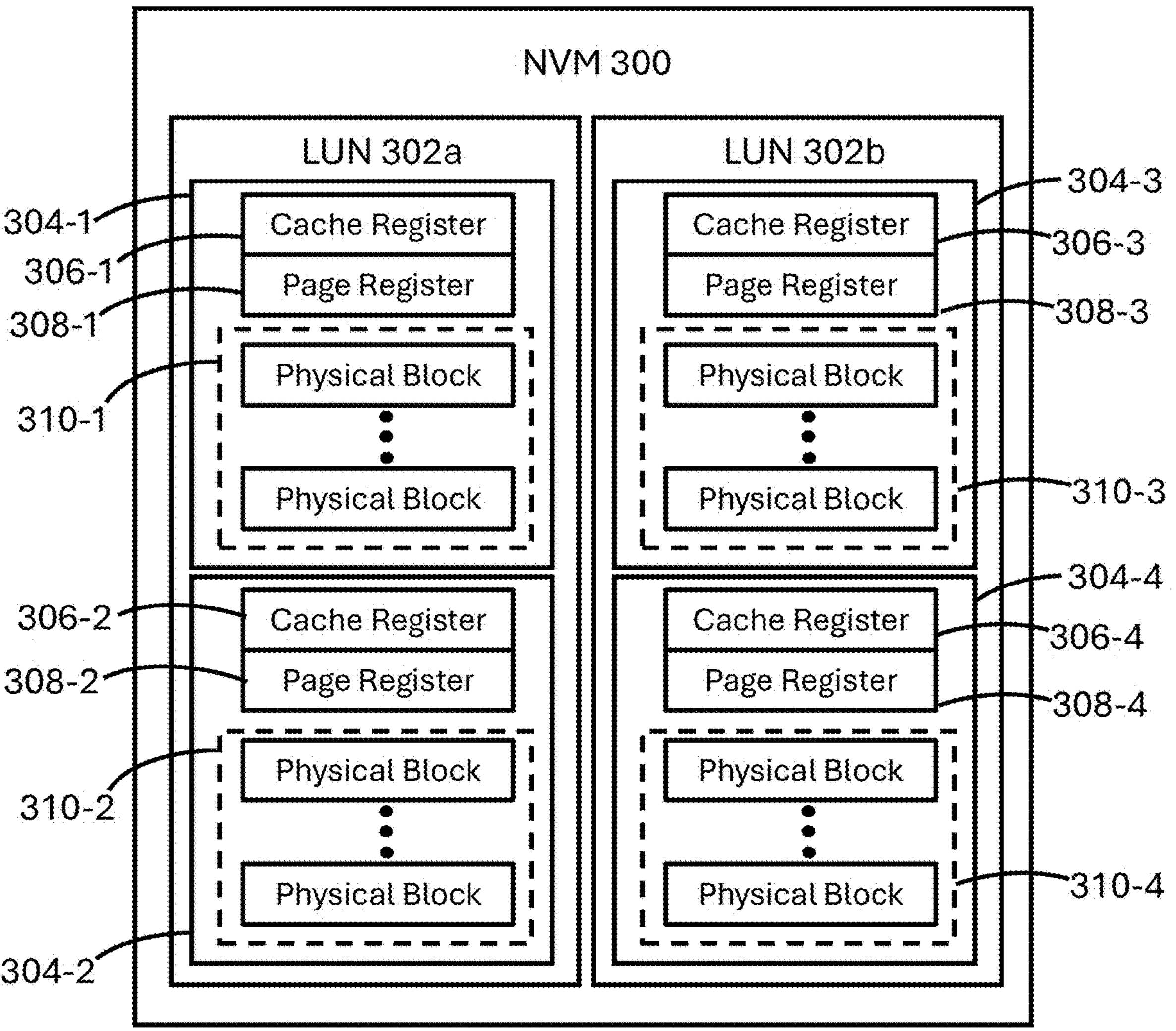
FIG. 3 illustrates an example non-volatile memory (NVM) media of data storage system of FIG. 1.

FIG. 3 illustrates an example NVM media 300. The NVM 300 may correspond to the NVM media 116 of FIG. 1, without limitation. The NVM media 300 may include a LUN 302*a* and a LUN 302*b*. The LUN 302*a* may include a plane 304-1 and a plane 304-2. The plane 304-1 may include a cache register 306-1, a page register 308-1, and physical blocks 310-1. The plane 304-2 may include a cache register 306-2, a page register 308-2, and physical blocks 310-2. The LUN 302*b* may include a plane 304-3 and a plane 304-4. The plane 304-3 may include a cache register 306-3, a page register 308-3, and physical blocks 310-3. The plane 304-4 may include a cache register 306-4, a page register 308-4, and physical blocks 310-4. It would be appreciated by one of ordinary skill in the art that the NVM media 300 may include more than two (2) die and each die may include more than two (2) planes. In various examples, the NVM media 300 may include two (2), four (4), eight (8), sixteen (16), twenty four (24), thirty two (32), or more die, without limitation. Each die may include, for example, four (4), six (6), eight (8), or more planes, without limitation.

When data is written to or retrieved from the LUN 302*a* or the LUN 302*b*, the data may be temporarily stored in one of the cache registers 306-1, 306-2, 306-3, 306-4 and/or the page registers 308-1, 308-2, 308-3, 308-4. The cache registers 306-1, 306-2, 306-3, 306-4 and the page registers 308-1, 308-2, 308-3, 308-4 may respectively have an equivalent data capacity of one page. Accordingly, data to be written to one page of one of the physical blocks 310-1 may be temporarily stored in the cache register 306-1 while data to be written to another page of one of the physical blocks 310-1 may be temporarily stored in the page register 306-1. Data to be read from a page of one of the physical blocks 310-1 may be retrieved and temporarily stored in one of the cache register 306-1 and the page register 308-1 while data to be written to a particular page may be stored in the other of the cache register 306-1 and the page register 308-1. Accordingly, the cache register and page register enable double buffering of data to reduce data programming and read times. Each page may include a plurality of cells. Data bits may be written to the plurality of cells on a page-by-page basis. Data may be erased from the plurality of cells on a physical block basis.

In various examples, one or more VWLs and/or VBs may be formed across the planes 304-1, 304-2, 304-3, 304-4. In an example, a VWL may include one (1) wordline from each plane 304-1, 304-2, 304-3, 304-4. A VB may include one (1) physical block 310-1 from the plane 304-1, one (1) physical block 310-2 from the plane 304-2, one (1) physical block 310-3 from the plane 304-3, and one (1) physical block 310-4 from the plane 304-4. The wordlines or physical blocks that make up a VWL or VB may be in a same location of each plane 304-1, 304-2, 304-3, 304-4. Consequently, the wordlines of a VWL or physical blocks of a VB may have a same physical address within their respective planes 304-1, 304-2, 304-3, 304-4. Accordingly, complex address translation is not required to write data to or read data from each VWL or VB.

Figure 4:
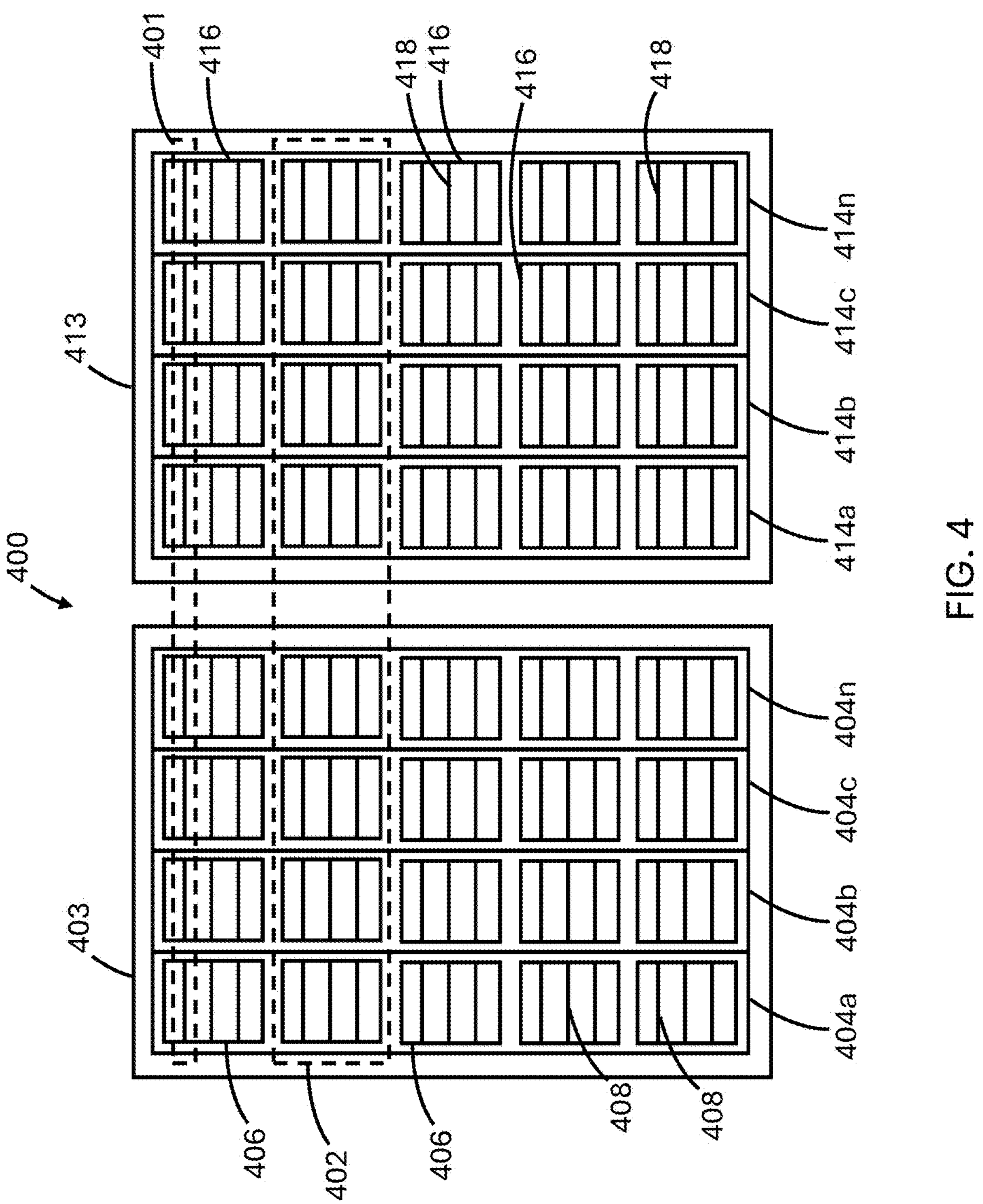
FIG. 4 illustrates example logical units (LUNs) of the system of FIG. 1 including a virtual wordline (VWL) and a virtual block (VB)

FIG. 4 illustrates logical units (LUNs) 400 including a virtual wordline (VWL) 401 and a virtual block (VB) 402. The LUNs include a LUN 403 and a LUN 413. In various examples, only two (2) LUNs 403, 413 are shown for simplicity. It would be appreciated by one of ordinary skill in the art that VWLs and VBs may span more than two (2) LUNs. For example, a memory device may include sixteen (16) channels. Each channel may include eight (8) NVM media. Each NVM may include two (2) or more LUNs. Each LUN may include two (2) or more planes. A VWL may include one (1) wordline from each plane of each LUN of each NVM media across all channels. A VB may include one (1) physical block from each plane of each LUN of each NVM media across all channels. It would be appreciated by ordinary skill in the art that the number of channels, NVM media, LUNs, and planes of the memory device described above are exemplary, and memory devices may include various different numbers of channels, NVM media, LUNs, and planes without departing from the scope of the present disclosure.

The LUN 403 may include a plurality of planes 404*a*, 404*b*, 404*c*, . . . , 404*n*. Each of the plurality of planes 404*a*, 404*b*, 404*c*, . . . , 404*n* may include a plurality of physical blocks 406. Each of the physical blocks 406 may include a plurality of wordlines (WLs) 408. The LUN 413 may include a plurality of planes 414*a*, 414*b*, 414*c*, . . . , 414*n*. Each of the plurality of planes 414*a*, 414*b*, 414*c*, . . . , 414*n* may include a plurality of physical blocks 416. Each of the physical blocks 416 may include a plurality of WLs 418. Each of the WLs 408, 418 may include a plurality of pages (not shown). Each page may include a plurality of cells (not shown). Data bits may be written to and/or read from the cells.

The VWL 401 may be formed across a plurality of the WLs 408, 418. The VWL 401 may include one (1) WL 408 from each of the planes 404*a*, 404*b*, 404*c*, . . . , 404*n* and one (1) WL 418 from each of the planes 414*a*, 414*b*, 414*c*, . . . , 414*n*. The WLs 408 of the VWL 401 may correspond to a same physical location of each plane 404*a*, 404*b*, 404*c*, . . . , 404*n*. The WLs 418 of the VWL 401 may correspond to a same physical location of each plane 414*a*, 414*b*, 414*c*, . . . , 414*n*. For example, the VWL 401 may include a first WL 408 of a first block 406 of the plane 404*a*, a first WL 408 of a first block 406 of the plane 404*b*, and so on. The first block 406 of the plane 404*a* and the first block 406 of the plane 404*b* may be located within a same row of the LUN 403. Accordingly, data may be written horizontally across the WLs 408, 418 of the VWL 401.

In various examples, a plurality of VWLs 401 may be formed across each plane of each LUN 400. For example, the first block 406 of each plane 404*a*, 404*b*, 404*c*, . . . , 404*n* and the first block 416 of each plane 414*a*, 414*b*, 414*c*, . . . , 414*n* may be formed into a plurality of VWLs. Each VWL may span a corresponding WL 408 of the first block 406 of each plane 404*a*, 404*b*, 404*c*, . . . , 404*n* and a corresponding WL 418 of the first block 416 of each plane 414*a*, 414*b*, 414*c*, . . . , 414*n*. For example, a second WL 408 of the first block 406 of the planes 404*a*, 404*b*, 404*c*, . . . 404*n* and a second WL 418 of the first block 418 of the planes 414*a*, 414*b*, 414*c*, . . . , 414*n* may be formed into a second VWL. Accordingly, the LUNs 400 may include up to a number of VWLs 401 equal to a number of WLs 408, 418, in one (1) of the planes 404*a*, 404*b*, 404*c*, . . . , 404*n*, 414*a*, 414*b*, 414*c*, . . . , 414*n*.

The VB 402 may be formed across a plurality of the physical blocks 406, 416. The VB 402 may include one (1) physical block 406 from each of the planes 404*a*, 404*b*, 404*c*, . . . , 404*n* and one (1) physical block 416 from each of the planes 414*a*, 414*b*, 414*c*, . . . , 414*n*. The physical blocks 406 of the VB 402 may correspond to a same physical location of each plane 404*a*, 404*b*, 404*c*, . . . , 404*n*. The physical blocks 416 of the VB 402 may correspond to a same physical location of each plane 414*a*, 414*b*, 414*c*, . . . , 414*n*. For example, the VB 402 may include a second physical block 406 of the plane 404*a*, a second physical block 406 of the plane 404*b*, and so on. The second physical block 406 of the plane 404*a* and the second physical block 406 of the plane 404*b* may be located within a same row of the LUN 403. Accordingly, data may be written horizontally across the WLs 408, 418 of the physical blocks 406, 416 of VB 402.

In various examples, a plurality of VBs 402 may be formed across each plane of each LUN 400. For example, the second block 406 of each plane 404*a*, 404*b*, 404*c*, . . . , 404*n* and a second block 416 of each plane 414*a*, 414*b*, 414*c*, . . . , 414*n* may be formed into a first VB. A third block 406 of each plane 404*a*, 404*b*, 404*c*, . . . , 404*n* and a third block 416 of each plane 414*a*, 414*b*, 414*c*, . . . , 414*n* may be formed into a second VB. Each VB may span a corresponding physical block 406 of each plane 404*a*, 404*b*, 404*c*, . . . , 404*n* and a corresponding physical block 416 of each plane 414*a*, 414*b*, 414*c*, . . . , 414*n*. Accordingly, the LUNs 400 may include up to a number of VBs 402 equal to a number of physical blocks 406, 416, in one (1) of the planes 404*a*, 404*b*, 404*c*, . . . , 404*n*, 414*a*, 414*b*, 414*c*, . . . , 414*n*.

Figure 5:
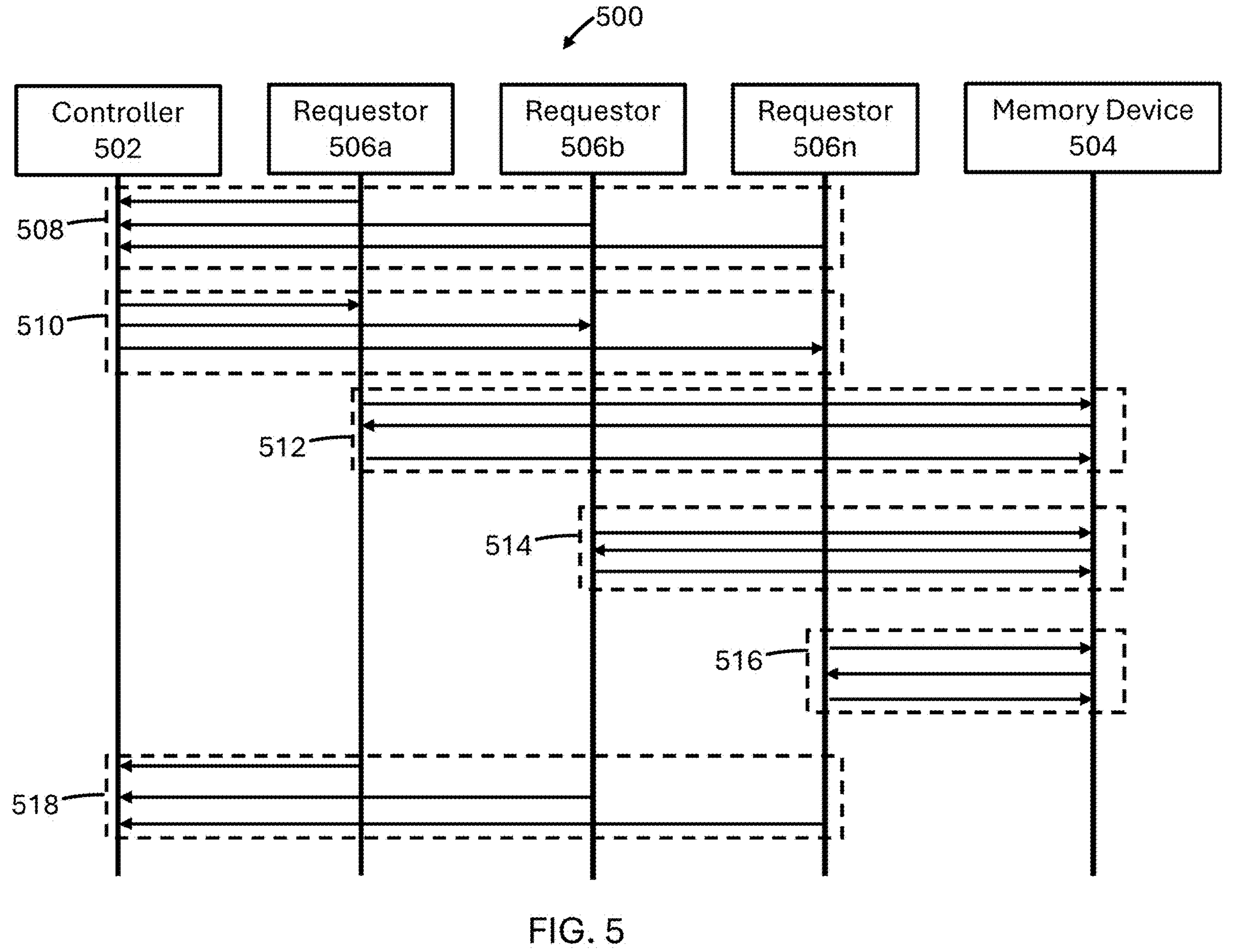
FIG. 5 illustrates an example process flow for parallel data requests performed by the system of FIG. 1.

FIG. 5 illustrates a process flow 500 for parallel data requests. The process flow 500 may be initiated by a controller 502 (i.e. the host controller 104 of FIG. 1) or one of a plurality of data requestors 506*a*, 506*b*, . . . , 506*n* (i.e. the data requestors 103*a*, 103*b*, . . . , 103*n*, and 103*x* of FIG. 1). The controller 502 may manage access to a memory device 504 (i.e. the memory device 114 of FIG. 1) by the data requestors 506*a*, 506*b*, . . . 506*n*. The controller 502 may respectively assign dedicated memory spaces to each of the data requestors 506*a*, 506*b*, . . . , 506*n*. The dedicated memory spaces may include virtual wordlines (VWLs), virtual blocks (VBs), or a combination thereof. The data requestors 506*a*, 506*b*, . . . , 506*n* may directly access their dedicated memory spaces, as provisioned by the controller 502, to write data to and/or read data directly from the memory device 504.

Each memory space may have a corresponding physical address. The controller 502 may send the respective physical address(es) of the dedicated memory space(s) to each corresponding one of the requestors 506*a*, 506*b*, . . . 506*n*, in accordance with the memory space assignments. A given physical address may be used by the memory device 504 to locate a corresponding memory space.

In various examples, the data requestors 506*a*, 506*b*, . . . , 506*n* may be integrated in a host system (i.e. the host system 101 of FIG. 1). Alternatively or additionally, some or all of the data requestors 506*a*, 506*b*, . . . , 506*n* may be physically separate from the host system and may access the memory device 504 through the host system over a communications network (i.e. the network 212 of FIG. 2). In various examples, the data requestors 506*a*, 506*b*, . . . , 506*n* may include one or more graphics processing units (GPUs), sensor arrays, gaming systems, artificial intelligence (AI) or machine learning (ML) systems, or other systems requiring data intensive operations, without limitation.

The data requestors 506*a*, 506*b*, . . . , 506*n* may send respective data access requests 508 to the controller 502. In various examples each data access request 508 may include a data requestor identifier (ID) and/or the physical address(es) of corresponding memory space(s) of the dedicated memory space(s). In one or more embodiments, the data access requests 508 may include respective requestor IDs corresponding to each of the data requestors 506*a*, 506*b*, . . . , 506*n*. If the data requests 508 do not include respective physical addresses, the controller 502 may retrieve the respective physical address(es) based on the data requestor ID.

In response to receiving and/or based on the data access requests 508, the controller 502 may generate a queue of the data requestors 506*a*, 506*b*, . . . , 506*n* and/or of the data access requests 508. The queue may define time slices for enabling the data requestors 506*a*, 506*b*, . . . , 506*n* to access their dedicated memory spaces.

The controller 502 may send data access information 510 to each of the data requestors 506*a*, 506*b*, . . . , 506*n*. The data access information 510 may respectively include a time slice for accessing the memory device 504 according to the queue and other information for accessing the memory device 504. The data access information 510 may respectively enable the requestors 506*a*, 506*b*, . . . , 506*n* to directly access the memory device 504 in a time sliced manner as defined by the queue. In various examples, the other information for accessing the memory device 504 may include a physical address of a corresponding memory space. In some examples, the physical addresses included in the data access information 510 may be the same physical addresses included in the data access request 508. In various examples, a given physical address assigned to one of the data requestors 506*a*, 506*b*, . . . , 506*n* may be updated, and the data access information 510 may include the updated physical address.

In various examples, in response to or based on receiving the data access information 510, the data requestor 506*a* may perform data operations 512. The data operations 512 may include retrieving data from the memory space of the memory device 504 assigned to the data requestor 506*a*, performing calculations on and/or otherwise processing the retrieved data, and sending the processed data back to the memory device 504 for storage in the memory space. The data operations 512 may include sending the physical address of the memory space assigned to the data requestor 506*a* to the memory device 504. In response to receiving the physical address, the memory device 504 may retrieve the data from the memory space. The data requestor 506*a* may perform data operations to process the retrieved data and send the processed data back to the memory device 504. The memory device 504 may store the processed data in the memory space assigned to the data requestor 506*a*.

In various examples, in response to or based on receiving the data access information 510, the data requestor 506*b* may perform data operations 514. The data operations 514 may be performed after the data operations 512 have concluded, in accordance with the time slice queue discussed in more detail above. The data operations 514 may include retrieving data from the memory space of the memory device 504 assigned to the data requestor 506*b*, performing calculations on and/or otherwise processing the retrieved data, and sending the processed data back to the memory device 504 for storage in the memory space. The data operations 514 may include sending the physical address of the memory space assigned to the data requestor 506*b* to the memory device 504. In response to receiving the physical address, the memory device 504 may retrieve the data from the memory space. The data requestor 506*b* may perform data operations to process the retrieved data and send the processed data back to the memory device 504. The memory device 504 may store the processed data in the memory space assigned to the data requestor 506*b*.

In various examples, in response to or based on receiving the data access information 510, the data requestor 506*n* may perform data operations 516. The data operations 516 may be performed after the data operations 514 have concluded, in accordance with the time slice queue discussed in more detail above. The data operations 516 may include retrieving data from the memory space of the memory device 504 assigned to the data requestor 506*n*, performing calculations on and/or otherwise processing the retrieved data, and sending the processed data back to the memory device 504 for storage in the memory space. The data operations 516 may include sending the physical address of the memory space assigned to the data requestor 506*n* to the memory device 504. In response to receiving the physical address, the memory device 504 may retrieve the data from the memory space. The data requestor 506*n* may perform data operations to process the retrieved data and send the processed data back to the memory device 504. The memory device 504 may store the processed data in the memory space assigned to the data requestor 506*n*.

In various examples, after the data operations 516 have concluded, the data requestors 506*a*, 506*b*, . . . 506*n* may send data operation information 518 to the controller 502. The data operation information 518 may include a confirmation of data access by the data requestors 506*a*, 506*b*, . . . 506*n* and telemetry information. In various examples, the memory device 504 may also provide telemetry data to the controller 502. The telemetry information may include a status of the memory spaces, error data, a volume of data stored in the memory spaces, an amount of time spent accessing the memory spaces by the data requestors 506*a*, 506*b*, . . . 506*n*, and other usage data associated with the data requestors 506*a*, 506*b*, . . . 506*n* and the memory device 504, without limitation. The other usage data associated with the data requestors 506*a*, 506*b*, . . . 506*n* and the memory device 504 may include a frequency of access by the data requestors 506*a*, 506*b*, . . . 506*n* and memory space health information, such as a number of program/erase (P/E) cycles and error rate data, without limitation. The telemetry data may be utilized by the controller 502 and/or the memory device 504 to re-assign certain memory spaces. For example, a first memory space may be more frequently utilized than a second memory space. A data requestor assigned to the first memory space may be reassigned to the second memory space in order to maintain the health of the memory device 504.

In various examples, the controller 502 may perform wear leveling and garbage collection (GC) operations. The wear leveling operations may include monitoring P/E cycles and/or error data of the memory spaces. The monitored P/E cycles and error data may be utilized to select memory spaces for data storage. For example, a memory space having a lowest number of P/E cycles and/or a lowest number of errors may be selected to store new data from a particular data requestor of the data requestors 506*a*, 506*b*, . . . 506*n*. Accordingly, the controller 502 can ensure that the memory spaces wear in an even manner to improve a lifetime of the memory device 504. The GC operations may include identifying valid data and invalid data for a particular memory space. The invalid data may be data that was erased. The GC operations may include moving valid data from the particular memory space to a different memory space and erasing the invalid data.

The controller 502 may modify memory space assignments for a subset of the memory spaces based on the telemetry data and the wear leveling and GC operations. For example, a first memory space may be more frequently utilized than a second memory space. A data requestor of the data requestors 506*a*, 506*b*, . . . 506*n* assigned to the first memory space may be reassigned to the second memory space in order to maintain the health of the memory device 504. In another example, a third memory space may be retired as part of the wear leveling and GC operations. Data stored in the third memory space may be moved to another memory space during the GC operations. A data requestor of the data requestors 506*a*, 506*b*, . . . 506*n* assigned to the third memory space may be reassigned to the fourth memory space in order to maintain the health of the memory device 504.

In various examples, the controller 502 may manage a list of physical addresses corresponding to the dedicated memory spaces. Each physical address of the list of physical addresses may be associated with a data requestor ID. The controller 502 may update the list when a memory space assignment changes or when a new data requestor is added. The controller 502 may update data requestors of updated memory space assignments. The update may include an updated physical address of the updated memory space. The update may be sent when the assignment is changed or when a given data requestor sends a new data request to the controller 502. Accordingly, conventional address conversion is not required for enabling the data requestors 506*a*, 506*b*, . . . , 506*n* to access the memory device 504. Further, enabling the data requestors 506*a*, 506*b*, . . . , 506*n* to directly access the memory device 504 may significantly reduce processing overhead of the controller 502 because the controller 502 does not have to process data retrieved from the memory device 504. Accordingly, enabling the data requestors 506*a*, 506*b*, . . . , 506*n* to directly access the memory device 504 using the physical addresses of the memory spaces may reduce latency, computational overhead, and power consumption in addition to improving the QoS for the data requestors 506*a*, 506*b*, . . . , 506*n*.

Figure 6:
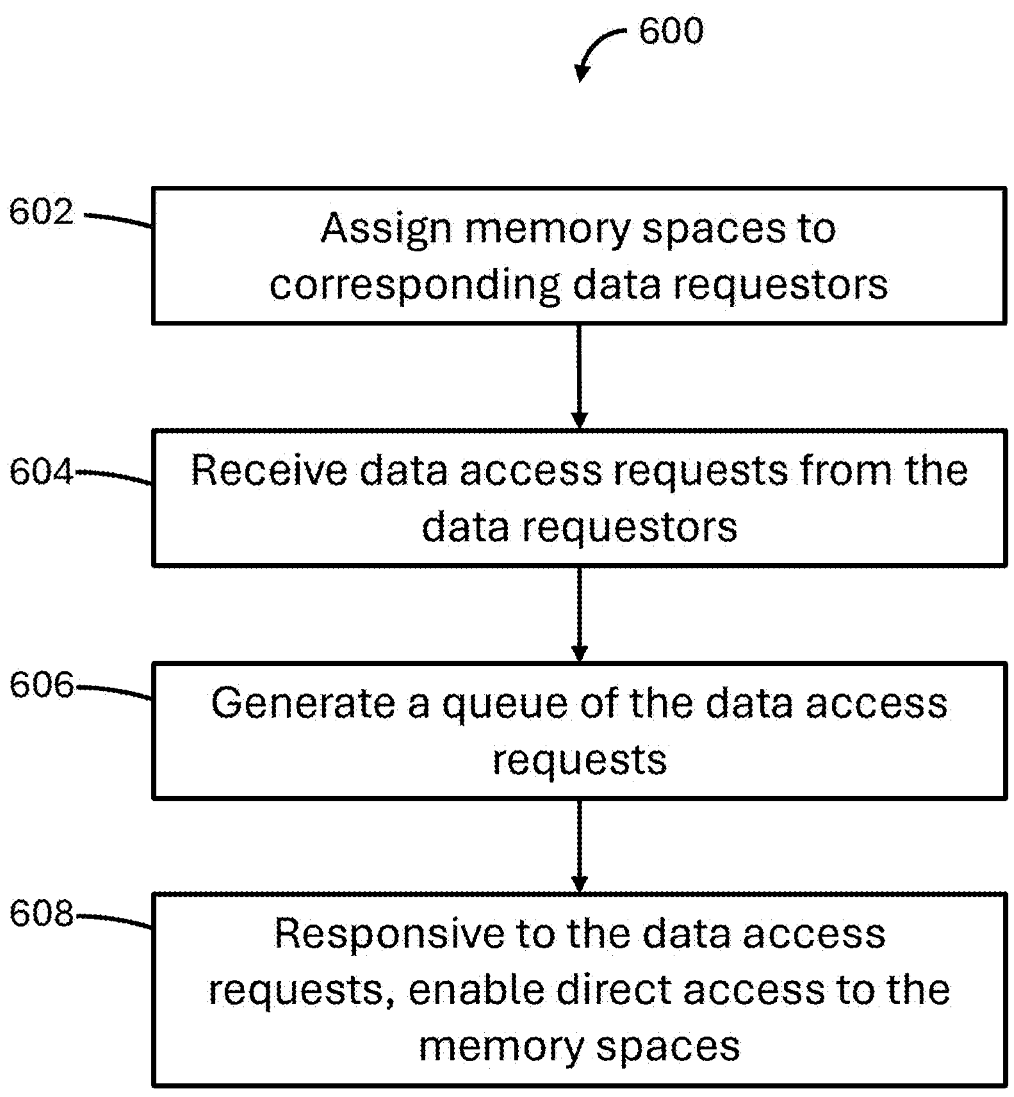
FIG. 6 illustrates an example method for parallel data requests performed by the system of FIG. 1.

FIG. 6 illustrates an example method 600 for parallel data requests. The method may be performed by a controller (e.g. the host controller 104, the controller 106 and/or controller(s) 118 of FIG. 1) of a host system (e.g. the host system 101 of FIG. 1), and/or a memory storage system (e.g. the data storage system 105 of FIG. 1). The controller may manage access to a memory device (e.g. the memory device 114 of FIG. 1) by a plurality of data requestors (e.g. the data requestors 103*a*, 103*b*, . . . , 103*n*, and 103*x* of FIG. 1). The memory device may include a plurality of memory spaces. Each of the memory spaces may have a corresponding physical address. The data requestors may use the physical addresses to directly access the memory device. The memory spaces may include virtual wordlines (VWLs) and virtual blocks (VBs). The controller may manage data access requests and memory space assignments for the data requestors.

The memory device may include a plurality of NVM media (e.g. the NVM media 116 of FIG. 1). The NVM media may each include a plurality of LUNs (e.g. the LUNs 302*a*, 302*b* of FIG. 3). Each LUN may include a respective set of planes (e.g. the planes 304-1, 304-2, 304-3, 304-4 of FIG. 3). The respective sets of planes may each include a plurality of physical blocks (e.g. the physical blocks 310-1, 310-2, 310-3, 310-4 of FIG. 3). The plurality of physical blocks may include a plurality of wordlines (e.g. the wordlines 408, 418 of FIG. 4). The NVM media may be organized into memory spaces. The memory spaces may include VWLs and VBs. A VWL may include one (1) wordline from each plane of each LUN of each NVM media. A VB may include one (1) physical block of each plane of each LUN of each NVM media. The physical addresses of each memory space may correspond to the physical addresses of the wordlines and/or blocks that form a VWL or VB. The wordlines and/or blocks may be in a same physical location of each respective plane. Consequently, the physical addresses of the wordlines or blocks of a VWL or VB may be the same for each plane, and data may be written to a VWL or VB horizontally across the planes. Conventional logical to physical address translation may not be required to write data to or retrieve data from the memory spaces.

In various examples, the controller may manage a list of physical addresses corresponding to the dedicated memory spaces. Each physical address of the list of physical addresses may be associated with a data requestor ID. The controller may update the list when a memory space assignment changes or when a new data requestor is added. The controller may update data requestors of updated memory space assignments. The update may include an updated physical address of the updated memory space. The update may be sent when the assignment is changed or when a given data requestor sends a new data request to the controller.

Returning more specifically to the example method 600, at operation 602, the controller may assign memory spaces of the plurality of memory spaces to corresponding data requestors of the plurality of data requestors. The plurality of memory spaces may include VBs and VWLs. The memory spaces may have corresponding physical addresses. In various examples, the controller may send the physical addresses to the corresponding data requestors. The physical addresses may be sent to the corresponding data requestors when the assignment is made or when data requests are received from the data requestors.

At operation 604, the controller may receive data access requests from the data requestors. In various examples the data access requests may include the data requestor IDs of the corresponding data requestors. In one example, the data access requests may additionally or alternatively include the physical addresses of the corresponding memory spaces. In another example, the controller may retrieve the physical addresses of the corresponding memory spaces from the list based on the data requestor IDs. In a further example, a portion of the data access requests may include the physical addresses and a second portion of the data access requests may not include the physical addresses. The controller may retrieve the physical addresses from the list based on the data requestor IDs included in the second portion of the data access requests.

At operation 606, the controller may generate a queue of data access requests. The queue may define time slices for enabling the data requestors to access the corresponding memory spaces. After adding the data requestors to the queue, the controller may send a notification to the data requestors indicating respective times for accessing the corresponding memory spaces. In various examples, the notifications may include the physical addresses of the memory spaces, if necessary. For example, the notifications may include the physical addresses when the corresponding data requestor does not have the physical address or when the physical address assignment for the corresponding data requestor has changed. The data requestors may access the data storage system during the respective times. Accordingly, the controller may manage access to the data storage system by enabling one (1) data requestor to access the data storage system at a time according to the queue.

At operation 608, the controller may enable direct access to the memory spaces by the corresponding data requestors. Enabling direct access to the memory spaces may include sending the physical addresses of the memory spaces and/or the time slice assignments to the corresponding data requestors. The corresponding data requestors may directly access the memory device by sending the physical addresses to the memory device, for example during or for processing during the corresponding time slice. In one or more embodiments, the time slice assignment may be represented in or accompanied by a token or the like generated by the controller and conveyed by the corresponding requestor to the memory device with the data access request. The memory device may decode or otherwise analyze the token to confirm the assigned time slice for the requestor and thereby satisfy the corresponding data access request. The memory device may receive the physical addresses and retrieve the data corresponding to the physical addresses without performing conventional logical to physical address conversion.

The controller may collect telemetry data from the memory device and the data requestors. The telemetry information may include a status of the memory spaces, error data, a volume of data stored in the memory spaces, an amount of time spent accessing the memory spaces by the data requestors, and other usage data associated with the data requestors and the memory device, without limitation. The other usage data associated with the data requestors and the memory device may include a frequency of access by the data requestors and memory space health information, such as a number of P/E cycles and error rate data, without limitation. The telemetry data may be utilized by the controller and/or the memory device to re-assign certain memory spaces. For example, a first memory space may be more frequently utilized than a second memory space. A data requestor assigned to the first memory space may be reassigned to the second memory space in order to maintain the health of the memory device.

In various examples, the controller may modify memory space assignments for a subset of the memory spaces based on the telemetry data. The controller may send updated physical addresses of the subset of the memory spaces to data requestors of the plurality of data requestors having modified memory space assignments. Enabling the data requestors to directly access the memory device using the physical addresses may significantly reduce processing overhead of the controller because the controller does not have to process data retrieved from the memory device. Accordingly, enabling the data requestors to directly access the memory device using the physical addresses of the memory spaces may reduce latency, computational overhead, and power consumption in addition to improving the QoS for the data requestors.

Figure 7:
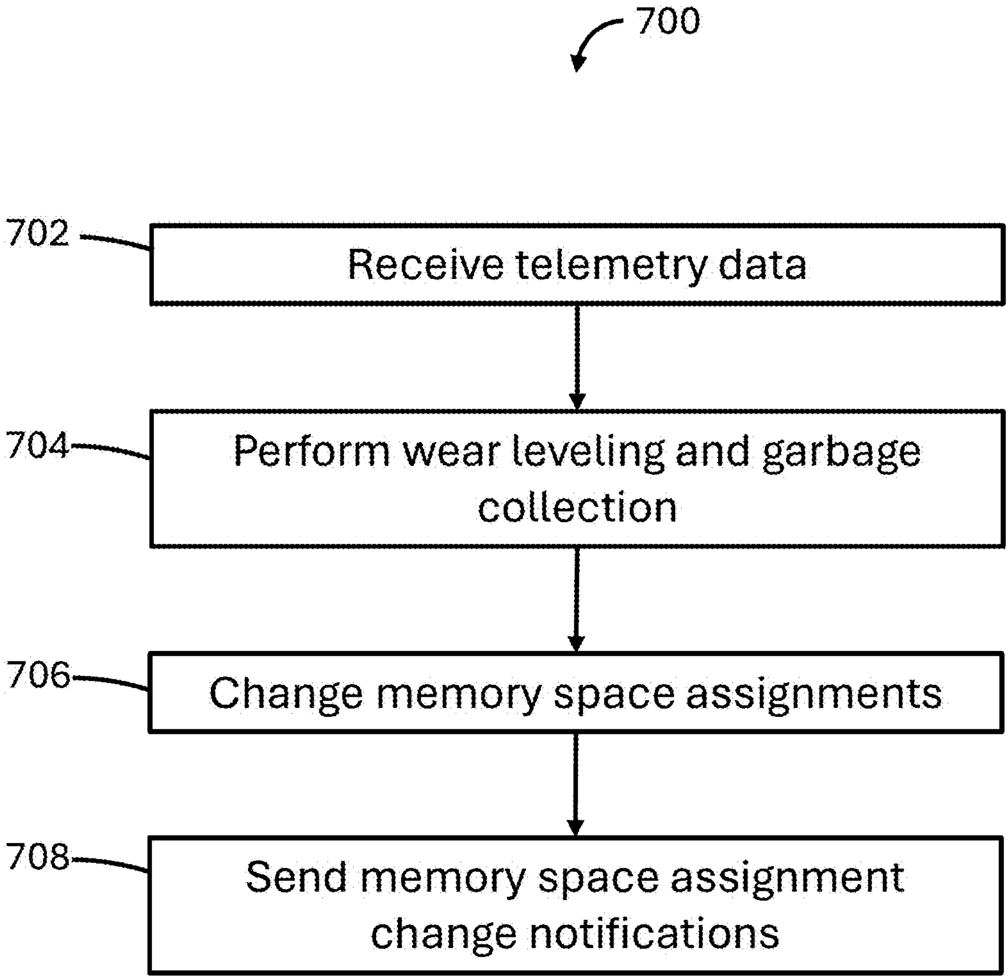
FIG. 7 illustrates an example method for memory space management performed by the system of FIG. 1.

FIG. 7 illustrates an example method 700 for memory space management. The method may be performed by a controller (e.g. the host controller 104, the controller 106 and/or controller(s) 118 of FIG. 1) of a host system (e.g. the host system 101 of FIG. 1), and/or a memory storage system (e.g. the data storage system 105 of FIG. 1). The controller may manage access to a memory device (e.g. the memory device 114 of FIG. 1) by a plurality of data requestors (e.g. the data requestors 103*a*, 103*b*, . . . , 103*n*, and 103*x* of FIG. 1). The memory device may include a plurality of memory spaces. Each of the memory spaces may have a corresponding physical address. The data requestors may use the physical addresses to directly access the memory device. The memory spaces may include virtual wordlines (VWLs) and virtual blocks (VBs). The controller may manage data access requests and memory space assignments for the data requestors.

The memory device may include a plurality of NVM media (e.g. the NVM media 116 of FIG. 1). The NVM media may each include a plurality of LUNs (e.g. the LUNs 302*a*, 302*b* of FIG. 3). Each LUN may include a respective set of planes (e.g. the planes 304-1, 304-2, 304-3, 304-4 of FIG. 3). The respective sets of planes may each include a plurality of physical blocks (e.g. the physical blocks 310-1, 310-2, 310-3, 310-4 of FIG. 3). The plurality of physical blocks may include a plurality of wordlines (e.g. the wordlines 408, 418 of FIG. 4). The NVM media may be organized into memory spaces. The memory spaces may include VWLs and VBs. A VWL may include one (1) wordline from each plane of each LUN of each NVM media. A VB may include one (1) physical block of each plane of each LUN of each NVM media. The physical addresses of each memory space may correspond to the physical addresses of the wordlines and/or blocks that form a VWL or VB. The wordlines and/or blocks may be in a same physical location of each respective plane. Consequently, the physical addresses of the wordlines or blocks of a VWL or VB may be the same for each plane, and data may be written to a VWL or VB horizontally across the planes. Conventional logical to physical address translation may not be required to write data to or retrieve data from the memory spaces.

Returning more specifically to the example method 700, at operation 702, the controller may receive telemetry data for the memory spaces. The telemetry information may include a status of the memory spaces, error data, a volume of data stored in the memory spaces, an amount of time spent accessing the memory spaces by the data requestors, and other usage data associated with the data requestors and the memory device, without limitation. The telemetry data may be received from the data requestors over a network (e.g. the network 212 of FIG. 2) and/or the memory spaces through an internal interface, such as a flash channel interface, without limitation. The other usage data associated with the data requestors and the memory device may include a frequency of access by the data requestors and memory space health information, such as a number of (P/E) cycles and error rate data, without limitation.

At operation 704, the controller may perform wear leveling and garbage collection (GC) operations. The wear leveling operations may include monitoring (P/E) cycles and/or error data of the memory spaces. The monitored P/E cycles and error data may be utilized to select memory spaces for data storage. For example, a memory space having a lowest number of P/E cycles and/or a lowest number of errors may be selected to store new data from a particular data requestor. Accordingly, the controller can ensure that the memory spaces wear in an even manner to improve a lifetime of the memory device. The GC operations may include identifying valid data and invalid data for a particular memory space. The invalid data may be data that was erased. The GC operations may include moving valid data from the particular memory space to a different memory space and erasing the invalid data.

At operation 706, the controller may modify memory space assignments for a subset of the memory spaces based on the telemetry data and the wear leveling and GC operations. For example, a first memory space may be more frequently utilized than a second memory space. A data requestor assigned to the first memory space may be reassigned to the second memory space in order to maintain the health of the memory device. In another example, a third memory space may be retired as part of the wear leveling and GC operations. Data stored in the third memory space may be moved to another memory space during the GC operations. A data requestor assigned to the third memory space may be reassigned to the fourth memory space in order to maintain the health of the memory device.

At operation 708, the controller may send memory space assignment change notifications to the data requestors of the plurality of data requestors having modified memory space assignments. The memory space assignment change notifications may include updated physical addresses of the memory spaces assigned to the corresponding data requestor. The notification may be sent to the host system for further transmission to the corresponding data requestors or directly from the memory device to the corresponding data requestors. The notifications may be sent through a network over a wired interface, such as a PCIe interface, a CXL interface, a UCIe interface, and the like, or a wireless interface (e.g. the communication element 208 of FIG. 2), without limitation. The notifications may be sent when the assignment change is made, after a plurality of assignment changes have been made, and/or when a new data request is received from a data requestor associated with the assignment change. Enabling the data requestors to directly access the memory device using the physical addresses may significantly reduce processing overhead of the controller because the controller does not have to process data retrieved from the memory device. Accordingly, enabling the data requestors to directly access the memory device using the physical addresses of the memory spaces may reduce latency, computational overhead, and power consumption in addition to improving the QoS for the data requestors.

According to various examples of the present disclosure, a system may include a memory device and a controller. The controller may include at least one processor and a memory. The memory may include instructions stored thereon, that when executed by at least one processor, cause the at least one processor to: assign memory spaces of the memory device respectively to corresponding ones of a plurality of data requestors, said memory spaces having corresponding physical addresses; receive data access requests from the plurality of data requestors; generate a queue of the data access requests for accessing the memory device; and, responsive to the data access requests, enable the plurality of data requestors to directly access corresponding ones of the respective memory spaces.

In combination with any of the previous examples, the respective memory spaces may include virtual wordlines and virtual blocks.

In combination with any of the previous examples, the instructions, when executed by the at least one processor, may cause the at least one processor to: collect telemetry data of the memory device; and modify memory space assignments for a subset of the respective memory spaces based on the collected telemetry data.

In combination with any of the previous examples, the instructions, when executed by the at least one processor, may cause the at least one processor to: send updated physical addresses of the subset of the memory spaces to those of the plurality of data requestors having modified memory space assignments.

In combination with any of the previous examples, the telemetry data may include a status and usage data for the memory spaces.

In combination with any of the previous examples, the modification of the memory space assignments may include changing memory space assignments for at least some of the plurality of data requestors based on the telemetry data.

In combination with any of the previous examples, the queue may define respective time slices for enabling the plurality of data requestors to directly access the corresponding ones of the respective memory spaces.

In combination with any of the previous examples, the instructions, when executed by the at least one processor, may cause the at least one processor to: perform wear leveling and garbage collection (GC) operations on respective ones of the memory spaces; and modify memory space assignments for a subset of the respective ones of the memory spaces based on the wear leveling and GC operations.

According to various examples of the present disclosure, a computer-implemented method may include: assigning memory spaces of a memory device respectively to corresponding ones of a plurality of data requestors, said respective memory spaces having corresponding physical addresses; receiving data access requests from a subset of the plurality of data requestors, said data access requests including respective physical addresses of the corresponding physical addresses; generating a queue of the data access requests for accessing the memory device; and responsive to the data access requests, enabling the subset of the plurality of data requestors to directly access the memory device.

According to various examples of the present disclosure, non-transitory computer readable media may include instructions stored thereon, that when executed by at least one processor, cause the at least one processor to: assign memory spaces of the memory device respectively to corresponding ones of a plurality of data requestors, said memory spaces having corresponding physical addresses; receive data access requests from the plurality of data requestors; generate a queue of the data access requests for accessing the memory device; and responsive to the data access requests, enable the plurality of data requestors to directly access corresponding ones of the respective memory spaces.

In this description, references to "one embodiment", "an embodiment", "embodiments", "an example", "one example", or "examples" mean that the feature or features being referred to are included in at least one embodiment or example of the technology. Separate references to "one embodiment", "an embodiment", "embodiments", "an example", "one example", or "examples" in this description do not necessarily refer to the same embodiment or example and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein, unless otherwise expressly stated and/or readily apparent to those skilled in the art from the description.

Certain examples are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various examples, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

While the present disclosure has been described herein with respect to certain illustrated examples, those of ordinary skill in the art will recognize and appreciate that the present disclosure is not so limited. Rather, many additions, deletions, and modifications to the illustrated and described examples may be made without departing from the scope of the disclosure as hereinafter claimed along with their legal equivalents. In addition, features from one example may be combined with features of another example while still being encompassed within the scope of the disclosure as contemplated by the inventors.

What is claimed is:

1. A data storage system comprising:

a memory device; and a controller including at least one processor and a memory, said memory including instructions stored thereon, that when executed by the at least one processor, cause the at least one processor to:

assign memory spaces of the memory device respectively to corresponding ones of a plurality of data requestors, said memory spaces having corresponding physical addresses;

receive data access requests from the plurality of data requestors;

generate a queue of the data access requests for accessing the memory device; and responsive to the data access requests, enable the plurality of data requestors to directly access corresponding ones of the respective memory spaces.

2. The data storage system of claim 1, wherein the respective memory spaces include virtual wordlines and virtual blocks.

3. The data storage system of claim 1, wherein the instructions, when executed by the at least one processor, cause the at least one processor to:

collect telemetry data of the memory device; and modify memory space assignments for a subset of the respective memory spaces based on the collected telemetry data.

4. The data storage system of claim 3, wherein the instructions, when executed by the at least one processor, cause the at least one processor to:

send updated physical addresses of the subset of the memory spaces to those of the plurality of data requestors having modified memory space assignments.

5. The data storage system of claim 3, wherein the telemetry data includes a status and usage data for the memory spaces.

6. The data storage system of claim 5, wherein the modification of the memory space assignments includes changing memory space assignments for at least some of the plurality of data requestors based on the telemetry data.

7. The data storage system of claim 1, wherein the queue defines respective time slices for enabling the plurality of data requestors to directly access the corresponding ones of the respective memory spaces.

8. The data storage system of claim 1, wherein the instructions, when executed by the at least one processor, cause the at least one processor to:

perform wear leveling and garbage collection (GC) operations on respective ones of the memory spaces; and modify memory space assignments for a subset of the respective ones of the memory spaces based on the wear leveling and GC operations.

9. A computer-implemented method, comprising:

assigning memory spaces of a memory device respectively to corresponding ones of a plurality of data requestors, said respective memory spaces having corresponding physical addresses;

receiving data access requests from a subset of the plurality of data requestors, said data access requests including respective physical addresses of the corresponding physical addresses;

generating a queue of the data access requests for accessing the memory device; and responsive to the data access requests, enabling the subset of the plurality of data requestors to directly access the memory device.

10. The computer-implemented method of claim 9, comprising:

collecting telemetry data of the memory device; and modifying memory space assignments for a subset of the respective memory spaces based on the collected telemetry data, wherein the respective memory spaces include virtual wordlines and virtual blocks.

11. The computer-implemented method of claim 10, comprising:

sending updated physical addresses of the subset of the memory spaces to those of the plurality of data requestors having modified memory space assignments.

12. The computer-implemented method of claim 10, wherein the telemetry data includes a status and usage data for the memory spaces, wherein modifying the memory space assignments includes changing memory space assignments for at least some of the plurality of data requestors based on the telemetry data.

13. The computer-implemented method of claim 9, wherein the queue defines respective time slices for enabling the plurality of data requestors to directly access the corresponding ones of the respective memory spaces, wherein the respective memory spaces include virtual wordlines and virtual blocks.

14. Non-transitory computer readable media having instructions stored thereon, that when executed by at least one processor, cause the at least one processor to:

assign memory spaces of the memory device respectively to corresponding ones of a plurality of data requestors, said memory spaces having corresponding physical addresses;

receive data access requests from the plurality of data requestors;

generate a queue of the data access requests for accessing the memory device; and responsive to the data access requests, enable the plurality of data requestors to directly access corresponding ones of the respective memory spaces.

15. The non-transitory computer readable media of claim 14, wherein the respective memory spaces include virtual wordlines and virtual blocks.

16. The non-transitory computer readable media of claim 14, wherein the instructions, when executed by the at least one processor, cause the at least one processor to:

collect telemetry data of the memory device; and modify memory space assignments for a subset of the respective memory spaces based on the collected telemetry data.

17. The non-transitory computer readable media of claim 16, wherein the instructions, when executed by the at least one processor, cause the at least one processor to:

send updated physical addresses of the subset of the memory spaces to those of the plurality of data requestors having modified memory space assignments.

18. The non-transitory computer readable media of claim 14, wherein the telemetry data includes a status and usage data for the memory spaces.

19. The non-transitory computer readable media of claim 18, wherein the modification of the memory space assignments includes changing memory space assignments for at least some of the plurality of data requestors based on the telemetry data.

20. The non-transitory computer readable media of claim 14, wherein the queue defines respective time slices for enabling the plurality of data requestors to directly access the corresponding ones of the respective memory spaces.

* * * * *